Dec. 6, 1966 V. A. IANNUCCI 3,289,810
MACHINE FOR ARRANGING UNITS FOR LOADING INTO CASES
Filed April 1, 1965 10 Sheets-Sheet 1

INVENTOR.
Vincent A. Iannucci
BY
ATTORNEY.

United States Patent Office 3,289,810
Patented Dec. 6, 1966

3,289,810
MACHINE FOR ARRANGING UNITS FOR
LOADING INTO CASES
Vincent A. Iannucci, Lincoln Park, Pa., assignor to Textile Machine Works, Wyomissing, Pa., a corporation of Pennsylvania
Filed Apr. 1, 1965, Ser. No. 444,746
29 Claims. (Cl. 198—34)

The instant invention relates to machines for arranging products such as cans into groups for loading into rectangular cartons or cases, and more particularly is concerned with machines to automatically arrange cans of the type which have a bail or handle consisting of a wire loop with its ends received in ears projecting from diametrically opposite sides of the cans into such groups. Such cans are typified by gallon paint cans which are normally packaged for shipment with four to a carton or case but it will be understood that the invention is not so limited and that cans of other types and sizes and for other purposes may be handled by the machine of the instant invention.

Bailed cans of the type referred to are, in accordance with present practice in the industry, discharged in succession from filling, lidding and bail applying stations. Where the bail applying step, suitably the final operation of those noted above, is performed by automatic equipment the bails of the succession of discharged cans lie substantially in a vertical plane extending in the direction of movement of the succession. In the event that the bail applying operation is performed manually a similar positioning of the bail and bail ears may be readily obtained by manual manipulation. In order to arrange the cans for loading into a compact package the cans must be separated from the succession and positioned in groups of four with the bails depressed from their upright positions to lie against the can walls and the cans must be rotated so that when they are in the case or carton the bail ears and the portions of the bails projecting outwardly therefrom lie in open spaces defined by the divergence of the cans from the carton walls.

The principal object of the instant invention is the provision of a machine adapted to receive a succession of bailed cans as they leave the bail applying station, and adapted to thereafter segregate the cans into a case load, to move the bails of the cans from their substantially vertical positions to positions in which they are in contact with the side walls of the cans and to rotate the cans to so position them that the vertical planes of the bail ears of each can lie diagonally and the bails are at the outer corners of the group.

Another object of the invention is the provision in a machine attaining the foregoing object of means for receiving the cans in a single file, shunting the cans into separate lanes while maintaining the bails thereof in substantially upright position, moving the cans through said lanes, separating two cans from the cans in each lane to form a group of four cans, lowering the bails against the sides of the cans and rotating the cans to position the bail ears and bails as aforesaid.

Another object of the invention is the provision of a machine of the aforesaid type including metering devices which permit the passage of two cans in each lane and then lock to prevent the passage of additional cans until certain conditions are met.

A further object of the invention is the provision of carriage means adapted to cooperate with the conveyor to move a segregated group of cans constituting a case load into loading position, the carriage means including means to rotate the cans during said movement.

Another object of the invention is the provision in such machine of means to insure that there is a full group of cans before the group is moved to loading position.

The invention will be more fully understood and further objects and advantages thereof will become apparent when reference is made to the more detailed description to follow and to the accompanying drawings in which:

FIG. 3 is a top elevational view on an enlarged scale and with parts shown in section, of a portion of the apparatus of FIG. 1;

FIG. 6 is a sectional view on an enlarged scale taken on the line 6—6 of FIG. 1 looking in the direction indicated by the arrows;

Figure 1:
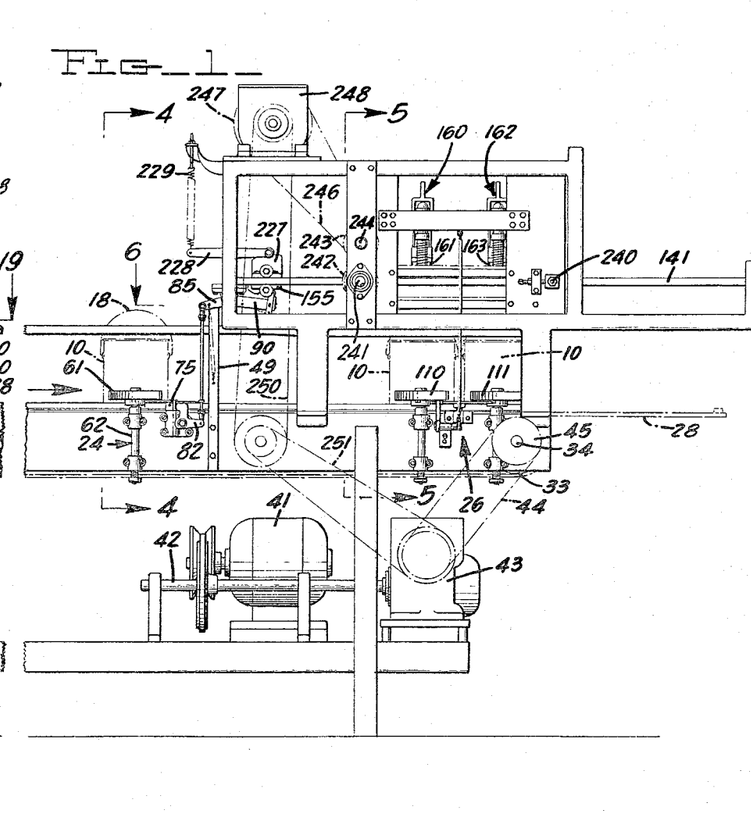
FIG. 1 is a side elevational view of a machine incorporating the instant invention.
Figure 2:
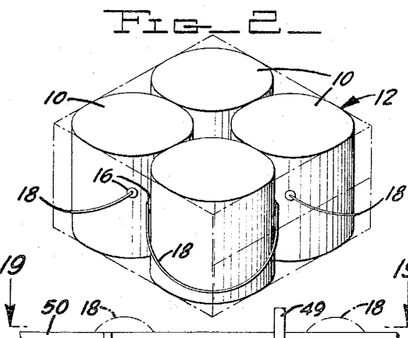
FIG. 2 is a perspective view of a group of cans as formed by the machine of the instant invention.

Referring now to the drawings and particularly to FIGS. 1 and 2 there is illustrated an apparatus in accordance with the instant invention adapted to receive cans 10, such as bailed cans, delivered in a single lane with their bails lying substantially in a common vertical plane, and to group the cans into a case load 12 with the cans arranged (see FIG. 2) with their bails against the walls of the cans and in positions where they will occupy the corners of the case or carton. The apparatus comprises a continuously driven conveyor 14 adapted to receive at its entry end (the left end as viewed in FIG. 1) cans to be grouped for packaging or encasing after filling, lidding and bail applying. The cans 10, such as gallon cans of paint, having bail ears 16 and bails 18 with their ends received in perforations of the bail ears, are delivered to conveyor 14 in a single line, either continuously or at intervals, with their bails upstanding and the vertical plane of the bail ears extending approximately longitudinally of the conveyor. A dividing wall 20 (see particularly FIGS. 4, 5 and 16) defines two chanels through which the cans are conveyed, the channels being of a width approximately equal to the diameters of the bodies of the cans. At the left end of the dividing wall 20, as viewed in FIGS. 1 and 16, a switching device 22 is pivotally mounted, the switching device functioning to shift the cans received on the conveyor alternately into the two channels.

As the cans travel forwardly along the channels, to the right as viewed in FIG. 1, they pass a metering station, indicated generally at 24 in FIG. 1, which permits the passage of a case load, two cans in each lane, and then locks to prevent further passage of the cans until the case load has been assembled and has been moved toward loading position. Forwardly of the metering station is a can assembly station indicated generally at 26. At the assembly station the cans are assembled into groups of four. Thereafter the group is moved forwardly past the ends of the conveyor 14 and onto a dead plate 28 in position to be loaded into a case by movement transversely of the machine. During said forward movement the bails are brought into contact with the sides of the cans and the cans are rotated to their final positions as shown in FIG. 2. A plunger means indicated diagrammatically at 30 in FIG. 3 then is operated to shift the load into a case positioned to receive it. The plunger means is indicated only diagrammatically as it may take various forms. Preferably such means and its associated loading mechanism is that disclosed in the prior application Serial No. 151,492, filed November 10, 1961, of J. L. Ferguson et al, and assinged to the assignee of the present application, now Patent No. 3,209,512.

The mechanism briefly referred to above will now be described in detail.

Referring particularly to FIGS 1, 4, 16 and 19 conveyor 14 comprises a pair of endless belts 32 positioned at opposite sides of the dividing wall 20, the latter being mounted on the machine frame in any suitable manner to extend upwardly between the belts. The belts, as illustrated in FIG. 1, are carried by rollers 33 keyed to suitable shafts 34 which in turn are mounted for rotation in bearings 36 (only the lefthand bearing being shown) supported on main frame members 37 on opposite sides of the machine. The belts are preferably composed of articulated relatively rigid elements and the upper flight of each belt is held against downward yielding movement by plates 38 supported from the machine frame and extending longitudinally beneath the outer margins of the upper flights of the belts and by flanges 39 projecting from dividing wall 20 and extending longitudinally of and underlying the inner margins of the upper flights of the belts. Plate members 38 support angle bars 40 the vertical flanges of which together with dividing wall 20 define the passageways or channels for the belts and for the cans. The width of the channels is such that the cans can move freely there along with slight clearance. It will be noted that the height of the dividing wall as well as that of the vertical flanges of angle bars 40 is such that neither will contact the can bails in any position of the latter. The belts are continuously driven to cause the upper flights thereof to travel in the directions indicated by the arrow, FIG. 1, and at the same predetermined uniform speed by a motor 41 through the medium of a line shaft 42, a speed reduction unit 43 and a belt drive 44 to a pulley 45 keyed to shaft 34 at the right-hand end of the conveyor as viewed in FIG. 1.

Figures 16, 17, 18, 18A, 19:
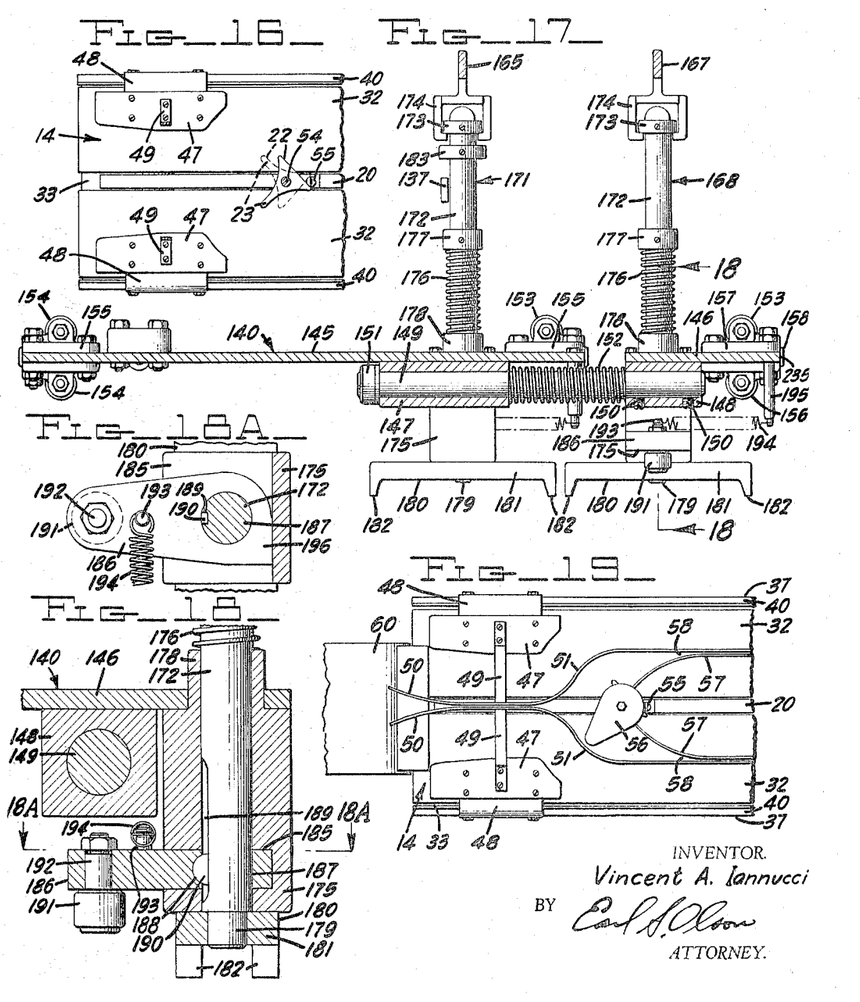
FIG. 16 is a top plan view on an enlarged scale of a portion of the apparatus of FIG. 1 looking in the direction of the arrows 16—16 of FIG. 1.
FIG. 17 is a sectional view on an enlarged scale taken on the line 17—17 of FIG. 3 looking in the direction indicated by the arrows.
FIG. 18 is a sectional view on an enlarged scale taken on the line 18—18 of FIG. 17 looking in the direction indicated by the arrows.
FIG. 18a is a sectional view on an enlarged scale taken on the line 18a—18a of FIG. 18 looking in the direction indicated by the arrows.
FIG. 19 is a top plan view on an enlarged scale of a portion of the apparatus shown in FIG. 1 looking in the direction of the arrows 19—19 of FIG. 1.

Adjacent the entry end of the conveyor (see FIG. 16) can guide or alignment plates 47 are supported on brackets 48, which are in turn secured as by rivets or bolts to the side frame members 37 the plates 47 partially overlying belts 32. Plates 47 are positioned and shaped to initially center the cans 10 on the conveyor as they are deposited thereon. Plates 47 are provided with upwardly extending brackets 49 having inwardly projecting arms at a level above the top of the cans supporting outer bail guides 50 adapted to contact the upstanding bails. Bail guides 50 are bent outwardly at the entry end of the conveyor to provide a funnel-shaped entry for the bails as illustrated in FIG. 19. Forwardly of brackets 49 each of the bail guides has a return bend 51 terminating in a straight section extending longitudinally of one of the belts for a portion of the length thereof, the straight section of ecah of the guides being outwardly offset slightly from the center line of the belt 32 which it overlies. Following the straight section each outer bail guide is curved outwardly and twisted as will be later explained.

At the end of the dividing wall 20 adjacent the entry end of the conveyor (see FIGS. 16 and 19) the switching device 22 is piotally mounted as illustrated particularly in FIG. 16. Switching device 22 comprises a substantially triangular plate having a forwardly projecting portion 23 and is fixed to a stud 54 extending upwardly between belts 32 and which is mounted for free pivotal movement on a stationary frame member. The extent the pivotal movement in either direction of device 22 is under the control of a stop 55 located between the belts. As will be readily understood the switching device whether in the full or dot-and-dash line positions of FIG. 16 will block one of the channels. Upon contact of a can with the device 22 and upon the continued forward movement of the can, the device will be rotated and force the can into the other channel and thereafter block that channel. The next can will contact device 22 and similarly be forced into the first channel and so on.

A bail deflector 56 (see FIGS. 5 and 19) is also mounted on stud 54 for movement therewith, the bail deflector lying substantially at the level of the guides 50. Bail deflector 56 is shaped as illustrated to have a forwardly projecting pointed portion overlying the projecting portion 23 of switching device 22. Inner bail guides 57 having free ends projecting under deflector 56 and curving therefrom toward the outer bail guides 50 form with the latter bail guides channels 58 each channel centrally overlying one of the belts 32 for a portion of the length of the belts, the channels at a point beyond the can metering station 24 being turned outwardly and twisted (see FIG. 3) as previously mentioned in reference to the outer bail guides 50. The channels terminate adjacent the forward ends of the belts. The inner and outer guides defining the channels are suitably supported from the frame of the machine at intervals by, in addition to brackets 49 supporting the outer guides, brackets 59 (see FIGS. 1 and 6).

In the operation of the apparatus as so far described the cans in single file on a delivery belt, indicated diagrammatically at 60 in FIG. 19, and with their bails in substantially upright positions and in longitudinally extending vertical planes enter between outer bail guides 50 as the cans are deposited substantially centrally on conveyor 14. As a lead can passes between plates 47 it is shogged into a position to lie centrally of the conveyor and thereafter contacts switching device 22 which, depending upon its position, is rotated by the can to deflect it into one or the other of the channels. Stud 54 is rotated with the switching device which causes simultaneous rotation of bail deflector 56 to insure that the can bail is deflected toward the outer bail guide of the channel to which the can is deflected. A succeeding can delivered by the conveyor 60 is similarly acted upon except that the switching device deflects the can into the other channel and the bail of such can is likewise deflected toward the outer bail guide 50 of that channel. Thus as a succession of cans are delivered to the machine the cans are alternately shunted into the two lanes and as they continue to travel their bails are confined by guide channels 58.

Figure 12:
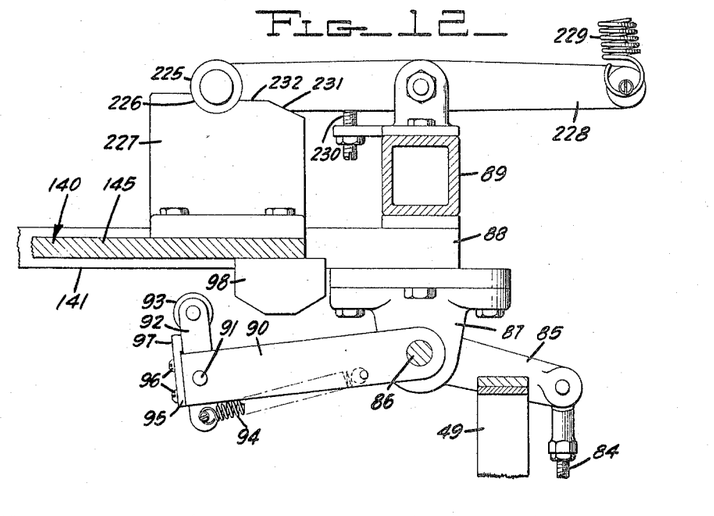
FIG. 12 is a sectional view on an enlarged scale taken on the line 12—12 of FIG. 4 looking in the direction indicated by the arrows.
Figures 13, 14, 14A:
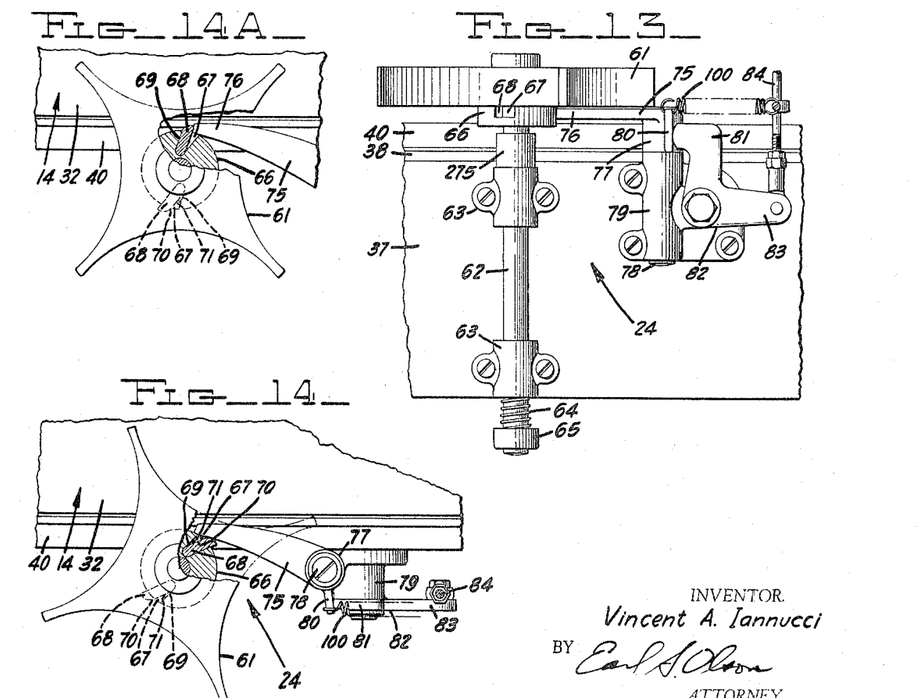
FIG. 13 is an elevational view on an enlarged scale of a portion of the apparatus of FIG. 4 looking in the direction indicated by the arrows 13—13.
FIG. 14 is a top plan view of the apparatus disclosed in FIG. 13.
FIG. 14a is a view similar to FIG. 14 showing parts of the apparatus at a different stage of operation.

Metering device 24, previously referred to, comprises star wheels 61 and controls therefor one of the star wheels being located (see FIGS. 3, 4 and 14) adjacent the outer margin of each of the channels. Inasmuch as the devices 24 for the two channels are substantially identical or mirror images of each other only one of these devices, namely the one nearest the viewer in FIG. 1, will be described in detail but the reference characters used will be applicable to the corresponding parts of both. Referring now particularly to FIGS. 1, 12, 13 and 14 each star wheel defines four arcuate recesses in the perimeter thereof, each of the recesses having a radius substantially equal to that of the cans. The star wheel is mounted for rotation with a shaft 62 the shaft in turn being supported in suitable bearings 63 carried by frame member 37. Shaft 62 extends below lower bearing 63 and suitably a compression spring 64 is mounted on the extending end between the bearing and a collar 65. The star wheel has a hub 66 provided with diametrically opposed notches 67 with diverging walls in which dogs 68 are pivotally mounted adjacent the inner ends of the notches for rocking movement therein. Referring particularly to FIG. 14 each of said notches is defined in part by an abutment wall 69 to be contacted by a face 70 of the associated dog when the dog is in its active position as will be hereinafter referred to. The relationship of the abutment walls 69 of the opposed notches is such that if the dogs are both rotated to their active positions their faces opposite faces 70 will lie in a diametric plane of the hub. Each dog is urged toward the wall of the notch opposite the abutment wall 69 by spring means 71 suitably comprising a coil spring in a recess of the hub.

A pawl 75 provided with a nose portion 76 adapted to ride on the periphery of hub 66 in position to be contacted by the dogs 68 includes an integral hub 77 mounted on a pin 78 carried for rotation in a bearing of a bracket 79 secured to frame member 37. A lever arm 80 projects from the hub 77 in position to be contacted by an arm 81 of a lever 82 mounted for rocking movement on bracket 79. A second arm 83 of lever 82, projecting at substantially right angles to arm 81, is connected by link 84 to a lever arm 85 fixed to a shaft 86 adjacent one end thereof for rotation therewith (FIG. 12). Shaft 86 extends across the machine and the corresponding lever arm 85 of the star wheel control means at other side of the machine is similarly fixed to shaft 86. Shaft 86 is mounted for rocking movement in brackets 87 the brackets in turn being secured to the end portions 88 of rails 141 carried by an upper transverse frame member 89. Secured to shaft 86 on the other side of bracket 87 from lever 85 is a lever arm 90. The outer end of lever arm 90 carries a pin 91 on which a cam follower arm 92 is pivotally mounted. A follower roller 93 is rotatably mounted on a pin projecting from the upper end of follower arm 92. An end of arm 92 projects below pivot pin 91 and a tension spring 94 has one end connected to the projecting end of follower arm 92 and its other end connected to lever arm 90. A stop plate 95 is secured as by screws 96 to the forward end of lever arm 90 the stop plate including an upwardly projecting portion 97 positioned in front of follower arm 92 to prevent its rotation in a counterclockwise direction, as viewed in FIG. 12, from the position at substantially right angles to arm 90 shown in that figure. Roller 93 is adapted to be acted upon by a cam plate 98 mounted on a carriage 140 for movement therewith longitudinally of the machine as will hereinafter be described.

Assuming a condition in which pawl 75 has its nose in contact with dog 68 thereby holding the star wheel in the stopped position illustrated in FIG. 14a, rotation of shaft 86 by depression of lever arm 90, as cam 98 passes follower roller 93 upon movement of the cam to the left as illustrated in FIG. 12, causes lever 85 to be rocked in a counterclockwise direction in turn rocking lever 82 through linkage 84 in a counterclockwise direction, as viewed in FIG. 13. Rocking of lever arm 81 of lever 82 in turn causes movement of pawl 75 in a clockwise direction as viewed in FIG. 14a removing the nose 76 of the pawl from behind the dog 68 and freeing the star wheel 61 for turning movement. Simultaneously with the movement of the nose of pawl 75 from behind the dog, the dog is rotated under the force of spring 71 from the position against the abutment wall as shown in FIG. 14a to its position against the opposite wall of notch 67 as shown in FIG. 14 whereby the star wheel remains released as pawl 75 is again rotated toward the hub 66 of the star wheel under the influence of a tension spring 100 as cam block 98 completes its passage past follower roller 93. Upon return movement of cam 98 to the position illustrated in FIG. 12, namely on a stroke of the cam in the right-hand direction, follower arm 92 rotates on pin 91 against the influence of spring 94 whereby the follower roller while depressed by cam 98 does not cause rotation of lever arm 90. It follows that with the star wheel 61 in the position illustrated in FIGS. 3 and 14a and with a cam 10 confined within a recess of the star wheel by dividing wall 20 the can will be held against forward movement by belt 32 as long as the pawl 75 remains in the position of FIG. 14a. However upon rocking of lever arm 90 by the action of cam 98 on follower roller 93 and the consequent retraction of pawl 75 from behind dog 68 the force exerted by can 10 in the resumption of its forward movement rotates the star wheel through approximately twenty-five degrees and the can passes therebeyond. As a succeeding can in the lane comes into contact with the star wheel the latter is rotated by the forward movement of the can through a further ninety degrees of movement the can moving past the star wheel without hindrance. As a third can contacts the star wheel the latter is again rotated but upon movement through an angle of approximately sixty-five degrees, which completes a one-hundred-eighty degree angle of movement, one of the dogs 68 is brought into contact with the end of the pawl and the dog rotated against its associated abutment wall 69 whereupon further rotation of the star wheel is prevented and the third can held in the position illustrated in FIG. 14a. Thus it will be noted that upon the dog releasing movement of pawl 75 the can held by the star wheel and one additional can will be allowed to pass beyond the star wheel and a third can will be retained by the star wheel until the pawl is again moved out of contact with dogs 68. It will also be understood that while the star wheels at the opposite sides of the machine are both released simultaneously they operate independently although in the same way to release a can held thereby and to pass a second can and retain a third whenever the second and third cans reach the star wheel.

Forwardly of the can metering station and at the cam assembly station 26 star wheels 110 and 111 are mounted in pairs, each pair being a mirror image of the other, on opposite sides of the machine, the construction of the star wheels and the mounting thereof being the same as the star wheels 61 (see FIGS. 1 and 7 to 11 inclusive). Thus each of the star wheels 110 and 111 of a pair is mounted on a shaft 112 supported in bearings 113 carried by frame member 37 and each includes a hub 114. The hubs are provided with diametrically opposed notches 116 having diverging walls. Dogs 117 are pivotally mounted adjacent the inner ends of the notches for rocking movement therein between positions adjacent forward abutment walls 118 and positions adjacent the opposite walls. Spring means 120 (FIG. 8) are employed to normally urge the dogs against the opposite walls.

Figure 8:
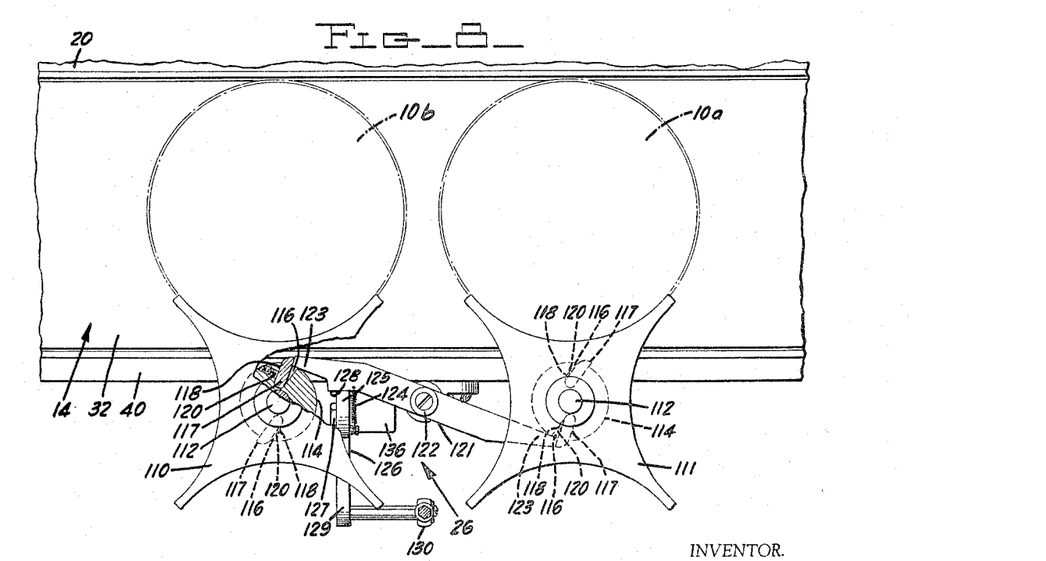
FIG. 8 is a top plan view of the apparatus of FIG. 7.

At either side of the machine for cooperation with the correspondingly located pair of star wheels a bar 121 is mounted for swinging movement on a pin 122 located equidistant between the shafts 112 and in the vertical plane thereof. Bar 121 includes ends 123 normally adapted to ride on the peripheries of hubs 114 in positions to be contacted by dogs 117, the bar being yieldably maintained with its ends riding on the hubs, except when the bar is rotated away therefrom by means hereinafter to be described, by a tension spring 124 having one end connected to the bar and the other end to a vertical arm 125 of a lever 126 mounted for rocking movement on a pin 127 carried by a bracket 136 secured to frame member 37. Arm 125 is maintained in contact with an abutment surface 128 on bar 121 by spring 124. A second substantially horizontal arm 129 of lever 126 is connected through linkage 130 (see FIG. 5) with an arm 131 of a lever 132 mounted for rocking movement on a pin 133 carried by a frame member 134. Lever 132 includes a second arm 135 having an end 137 adapted to be contacted for downward rocking movement by means hereinafter to be described.

As will be understood from the above description depression of lever arm 135 will through linkage 130 rotate lever 126 to cause its arm 125 to rotate bar 121 in a clockwise direction, as viewed in FIG. 8, to remove its ends 123 from behind the dogs 117 of star wheels 110 and 111 and free the latter for rotation.

Figure 9:
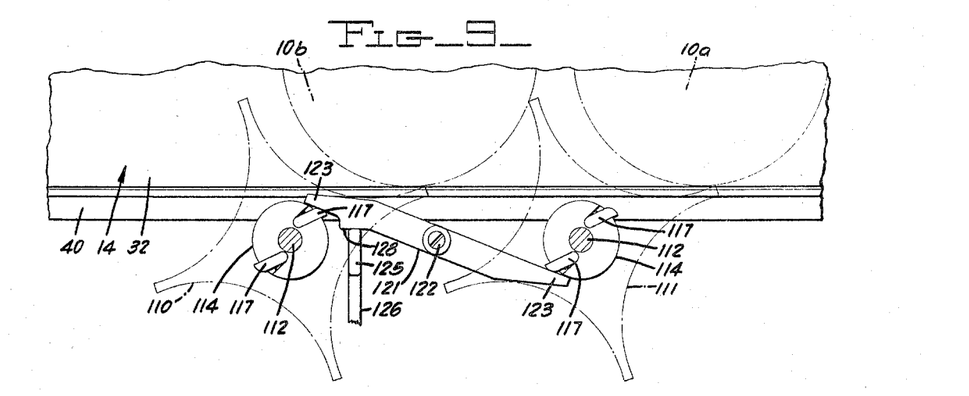
Figure 10:
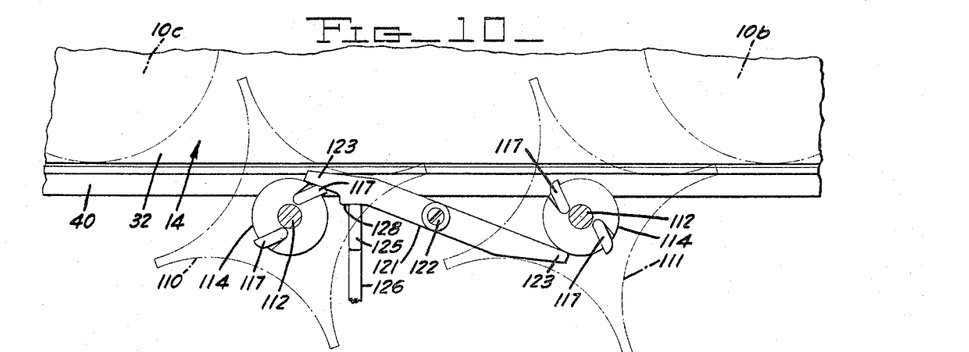
FIGS. 10 and 11 are views similar to FIG. 8 showing parts of the apparatus of FIG. 8 at different stages of operation.
Figure 11:
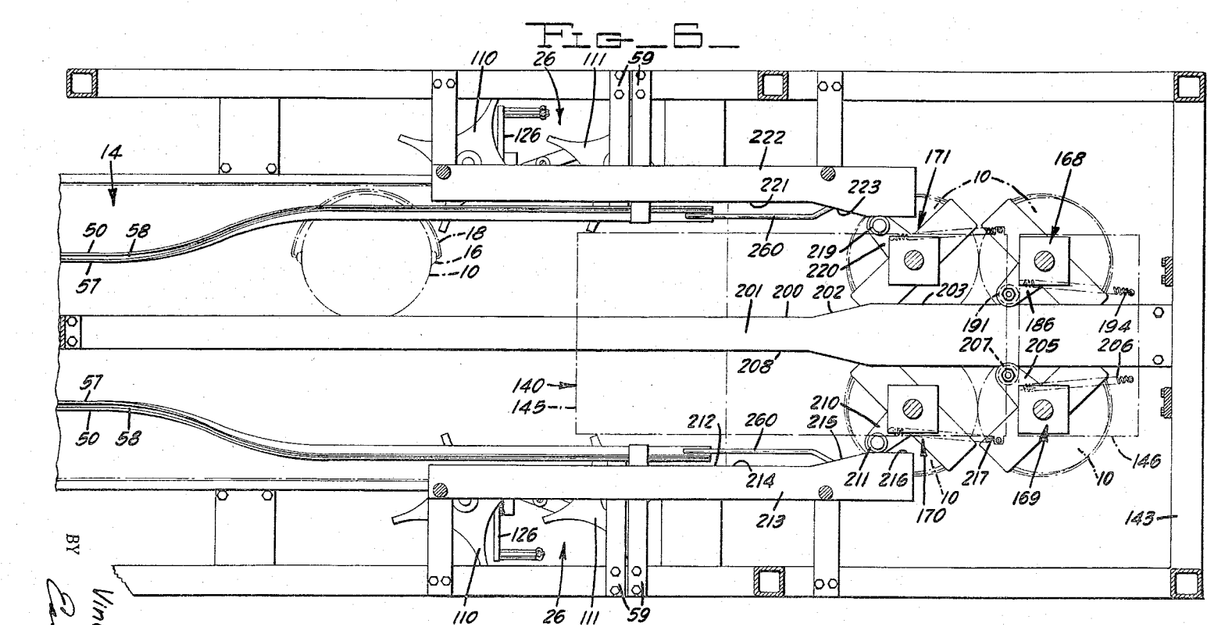

Assuming a starting condition with cans 10a and 10b confined by the star wheels 111 and 110 respectively, upon such release of the star wheels the cans 10a and 10b are moved forwardly by the belt and during such movement the star wheels are rotated through approximately twenty-five degrees to the positions illustrated in FIG. 9 can 10a being thereafter free for further movement. As the cans continue to move with the belt star wheel 111 is further rotated through ninety degrees by can 10b as that can moves past and beyond the star wheel. As an additional can 10c of the succession of cans conveyed down the channel reaches star wheel 110 it rotates the latter through a further ninety degrees to the position of FIG. 11 and passes beyond that star wheel into contact with star wheel 111 which is thereby rotated a further approximately sixty-five degrees which brings one of its dogs 117 into contact with an end 123 of bar 121 preventing further rotation of the star wheel 111 and holding the can 10c stationary. As another can 10d in the succession of cans moving down the channel contacts star wheel 110 it causes further rotation of the latter through approximately sixty-five degrees which brings one of its dogs 117 into contact with associated end 123 of bar 121 whereby rotation of the star wheel 110 is prevented and can 10d held against further movement. The same action takes place at the other side of the machine. Thus the star wheels are again positioned to retain a pair of cans in each of the channels until the conditions are met which causes rotation of the bars 121 to remove their ends 123 from behind the dogs 117.

Referring now particularly to FIGS. 1, 3 to 6, 15 and 17 to 18a inclusive a carriage indicated generally at 140 and previously mentioned is mounted for travel longitudinally of the conveyor on rails 141 which in turn are supported from frame member 89 and a second frame member 143 (see FIG. 3). The carriage is made up of two normally spaced but connected sections comprising a main bed member 145 and a forward bed member 146. Secured to the underside of the bed members 145 and 146 (see particularly FIGS. 3, 5 and 17) are blocks 147 and 148 respectively, each block having a pair of longitudinally extending bores with the bores of block 147 in alignment with the bores of block 148. Rods 149 are mounted in the aligned bores one end of each rod being secured to block 148 as by set screws 150. The other end of each rod is adapted for free sliding movement in an aligned bore of block 147 and projects beyond the block and is provided with a head as indicated at 151. Compression springs 152 are mounted on the rods between the blocks the springs normally holding the two bed members separated to the extent permitted by the rods 149.

The mounting means for the carriage includes front and rear pairs of rollers 153 and 154 at each side of the main bed member 145 the rollers being rotatably supported by mountings 155 and adapted to ride on the upper and lower surfaces of rails 141. Bed member 146 is similarly provided with pairs of rollers 156 supported on mountings 157 at the opposite sides thereof to ride on the rails 141. Mountings 155 and 157 also support rollers 158 rotatably mounted on vertical axes and riding on the inner edges of the rails 141 to prevent lateral displacement of the carriage (see FIG. 3).

Referring now particularly to FIGS. 3, 5, 17 and 18 a pneumatic cylinder-piston assembly 160 is mounted on bed member 145 as by bracket 161 (FIG. 5) and a similar pneumatic cylinder-piston assembly 162 is mounted on bed member 146 as by bracket 163 (FIG. 1). The piston rod 164 of assembly 160 is connected to a laterally extending crosshead 165. Similarly the piston rod 166 of assembly 162 is connected to a laterally extending crosshead 167. Both assemblies may be commercial items and are of the type in which the application of pneumatic pressure causes downward movement of the pistons and in which relief of such pressure permits the pistons to rise under spring pressure. The ends of the crossheads overlie and are connected to can holding devices indicated generally at 168, 169, 170 and 171. The several can holding devices are identical except for certain features to be pointed out hereafter and hence only the device 168 will be described in detail with respect to the common features. The device (see FIGS. 17 and 18) comprises a rod 172 to the upper end of which is secured a collar 173 received within a clevis 174 carried by an end of the crosshead 167. Rod 172 projects downwardly and has a lower end slidably and rotatably received in a vertical bore of a fitting 175 fixed to bed section 146. A compression spring 176 is mounted on rod 172 between a collar 177 secured to the rod and a flange 178 of fitting 175. A lower end 179 of rod 172 carries a holding member 180 fixedly secured thereto, the holding member comprising a crossbar 181 and downwardly extending pairs of prongs 182 at each end thereof. The prongs are tapered as illustrated and the distance between the pairs is such that when the holder is moved downwardly toward an underlying can, as hereinafter explained, the upper rim of the can will be somewhat pinched between them and firmly gripped thereby. Rods 172 of the can holding devices 170 and 171 supported on the main bed plate 145 carry collars 183 secured thereto in adjusted position thereon, collars 183 being adapted to contact the ends of levers 135 and depress them upon the downward movement of crosshead 165 whereby star wheels 110 and 111 are released for rotation in the manner previously explained (see FIG. 5).

Fitting 175 is slotted as at 185 (see FIGS. 18 and 18a) to receive a hub end of an arm 186 bored at 187 to slidably receive rod 172. Arm 186 and rod 172 are provided with opposed key slots 188 and 189 respectively to receive a key 190 whereby the arm will turn with the rod. The key and slot 188 are shaped to hold the key against vertical movement. However slot 189 in rod 172 is elongated to permit vertical movement of the rod relative to arm 186. A follower roller 191 is mounted for rotation on a pin 192 secured to the outer end of arm 186. The arm carries a pin 193 to which is secured one end of a tension spring 194 (see FIGS. 6, 17 and 18) the other end of this spring being secured to a pin 195 projecting downwardly from plate 146 whereby rod 172 is urged to rotate in a counterclockwise direction as viewed in FIGS. 6 and 18a, to a stopped position at substantially right angles to the longitudinal dimension of plate section 146. It is held in such stopped position against further rotation under the influence of spring 194 by contact of a squared corner 196 of the arm 186 with the base end of slot 185.

Referring now particularly to FIG. 6 roller 191 of arm 186 is positioned to follow a cam path 200 defined by one edge, the upper edge as viewed in FIG. 6, of a centrally located longitudinally extending plate member 201 suitably supported from the frame structure of the machine at the level of the roller. From a point substantially opposite star wheels 110 and 111 and for a distance forwardly thereof cam path 200 has a straight run and is sufficiently remote from rod 172 that arm 186 will remain in its laterally extending position of FIG. 18a as the roller travels therealong with the carriage. Forwardly of the straight section the cam has a riser 202 and thereafter a second straight run 203. As the carriage continues to move forwardly the roller will contact the riser 202 causing rotation of arm 186 and hence of the can holder and can held thereby through an angle of substantially forty-five degrees and thereafter ride on straight run 203 for the remainder of the travel of the carriage in a forward direction maintaining the holder and can in their rotated positions. An arm 205 forms a part of can holding device 169 and corresponds in all respects to arm 186 except that it is urged to rotate in a clockwise direction by its spring 206 to a stopped position. A roller 207 carried by arm 205 follows a cam path 208 which is the mirror image of cam path 200 whereby as the carriage moves forwardly can holding device 169 and the can held thereby are rotated through forty-five degrees in a counterclockwise direction and then maintained in their rotated positions.

An arm 210 forming a part of can holder 170 and again corresponding in all respects to arm 186 has its roller 211 positioned to follow a cam path 212 defined by an inner edge of a plate member 213 supported from the framework of the machine and extending longitudinally thereof at the level of the roller. Cam path 212 includes a straight run 214 lying opposite to straight run 200, a riser 215 and a short straight run 216. As the carriage moves forwardly arm 210 is at first permitted to remain in its normal laterally extending position in which it is held by a spring 217 and thence is rotated, and in turn rotates can holding device 170 and the can held thereby, through an angle of forty-five degrees in a clockwise direction as the roller rides up riser 215, the can holder and can being maintained in that position by straight run 216 for the remainder of the forward travel of the carriage. Arm 220 forming part of the can holding device 171 has a roller 219 which cooperates with another cam track 221 formed by the edge of a plate 222 supported by the framework at the opposite side of the machine, the cam track being the mirror image of cam track 212 whereby arm 220, can holding device 171 and the can held thereby during the first portion of the travel of the carriage remain in their normal positions, then are rotated in a counterclockwise direction through an angle of forty-five degrees as the roller of arm 220 rides up riser 223, and then remain in such position during the remainder of the carriage travel. As will be observed the action of the several can holders under the controls of the cam paths 200, 208, 212 and 221 cause rotation of the cans to position the planes of their bail ears across the corners of a group of the cans as the latter are positioned for loading.

Carriage 140 is shown in FIG. 3 in its rearward position and as will be noted from said figure the carriage is so dimensioned and the can holder devices are so positioned thereon that with the carriage in such position and with bed members 145 and 146 separated to the extent permitted by rods 149 each can holder centrally overlies a can when the latter is held by one of the star wheels 110 or 111 in locked position. The carriage is yieldably maintained in its rearward position by a latch roller 225 interfitting in a seat 226 formed in a block 227 mounted substantially centrally of the rear edge of bed member 145 (see FIGS. 3, 4 and 12). Roller 225 is carried by one arm of a lever 228 pivoted for rocking movement on frame member 89. The other end of the lever is connected to one end of a tension spring 229 the other end of which is connected to a machine frame member whereby the lever is urged to swing in a counterclockwise direction as viewed in FIG. 12. A suitable stop 230 is provided for support roller 225 at a level that upon movement of the carriage to its final stopped or rearward position (the position of FIGS. 3 and 12) roller 225 will ride up a cam surface 231 onto a level 232 and then ride into seat 226 as the movement of the carriage is completed.

Figure 4:
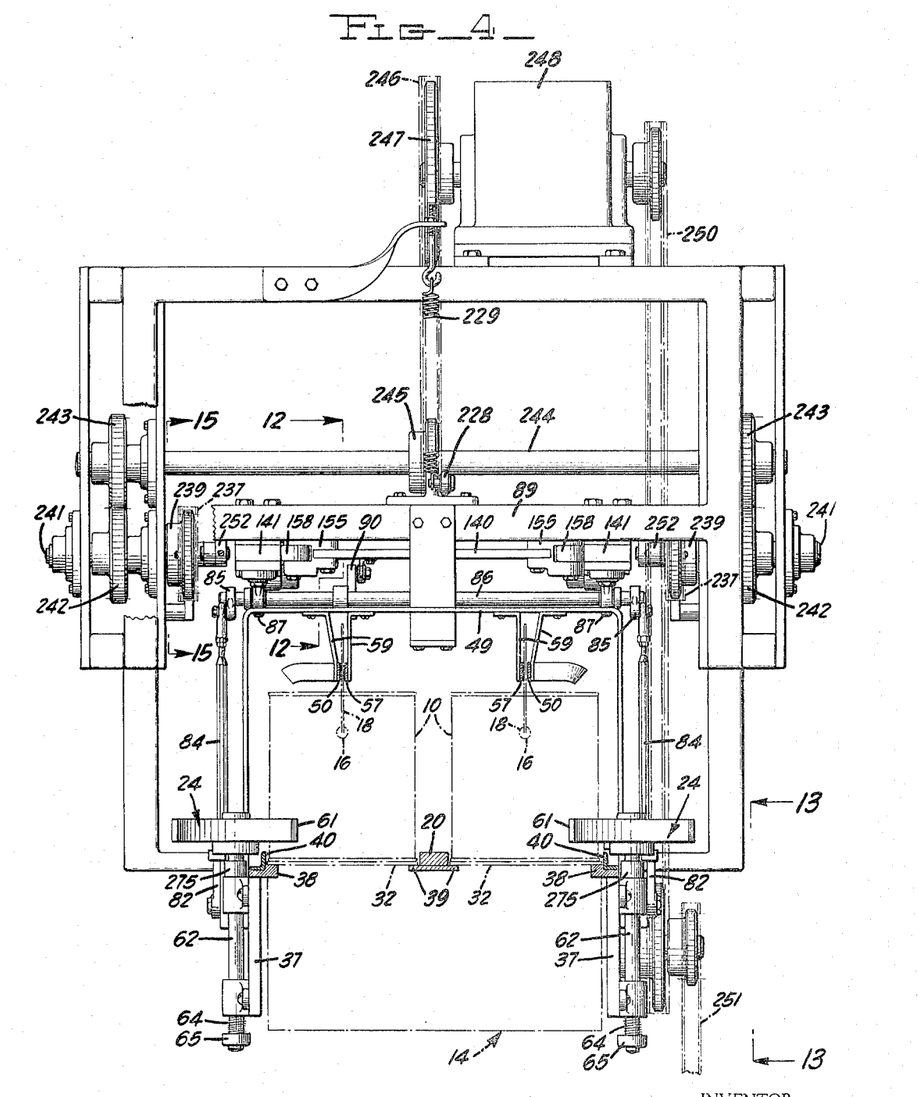
FIG. 4 is a sectional view on an enlarged scale taken on the line 4—4 of FIG. 1 looking in the direction indicated by the arrows.
Figure 5:
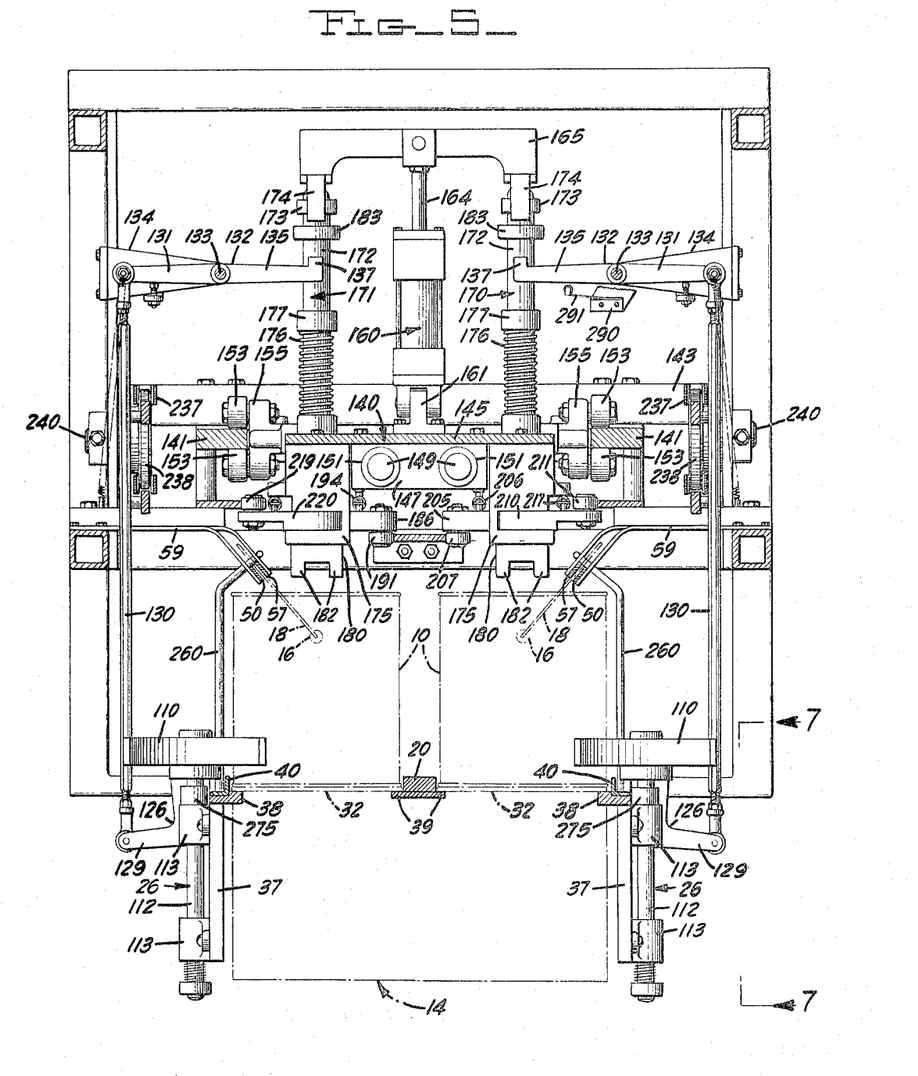
FIG. 5 is a sectional view on a further enlarged scale taken on the line 5—5 of FIG. 1 looking in the direction indicated by the arrows.
Figure 7:
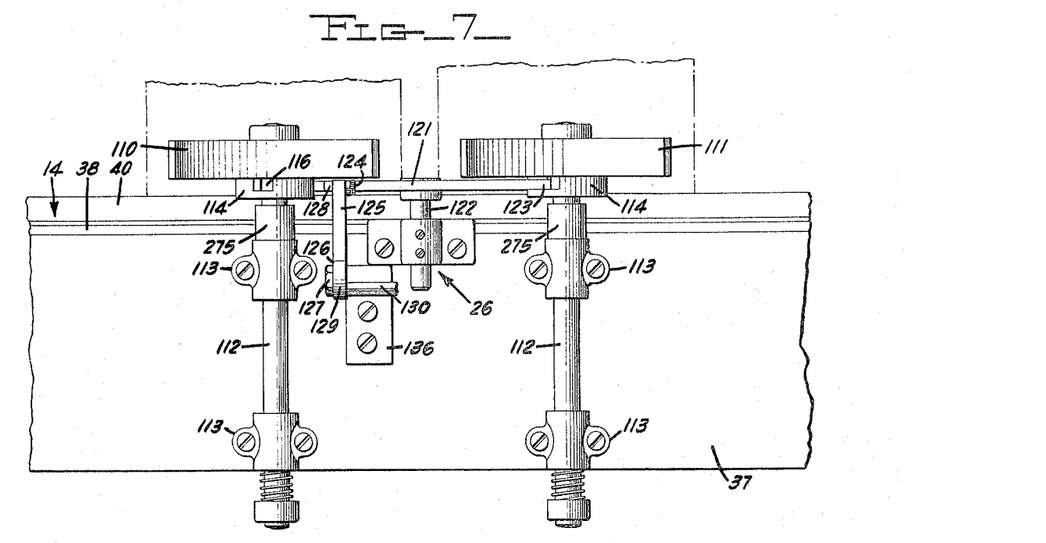
FIG. 7 is an elevational view on an enlarged scale looking in the direction of the arrows 7—7 of FIG. 5.
Figure 15:
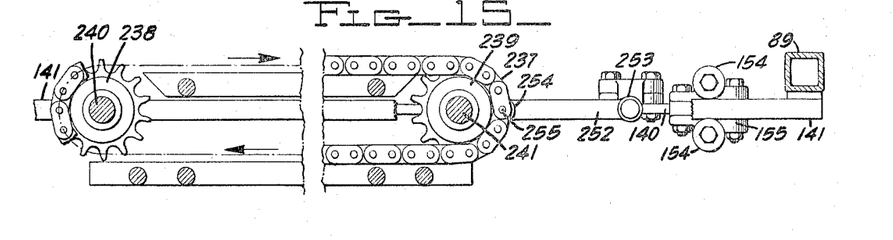
FIG. 15 is a sectional view on an enlarged scale taken on the line 15—15 of FIG. 4 looking in the direction indicated by the arrows.

Carriage 140 is driven between its rearward position, as illustrated in FIG. 3, and a forward position in which the forward edge 235 of bed member 146 contacts stop screws 236 carried by a frame member at the end of the machine and bed members 145 and 146 are moved into closer relationship against the force of springs 152, by sprocket chains 237 mounted on forward and rearward sprockets 238 and 239 respectively (see FIGS. 3, 4 and 15). The sprockets in turn are mounted on stub shafts 240 and 241 respectively carried for rotation in suitable bearings mounted on the machine frame above the level of the carriage, one of the sprocket chains and the sprockets therefor being located on each side of the machine. Stub shafts 241 have gears 242 keyed thereto, the gears 242 being in meshing engagement with gears 243 keyed to a shaft 244 extending transversely of the machine above the stub shafts and carried in suitable bearings supported by the frame structure. A sprocket gear 245 being driven through a sprocket chain 246 from a sprocket 247 on the output side of a one revolution solenoid operated clutch 248 mounted on the machine frame superstructure. The clutch is a commercial item and is of a type in which, when the solenoid is energized, the clutch will engage for one revolution and then automatically disengage. The input side of clutch 248 is constantly driven from gear box 43 through suitable driving connections including sprocket chains 250 and 251 and appropriate sprockets.

Referring particularly to FIGS. 3 and 15 carriage 140 is connected to the sprocket chains 237 at opposite sides of the machine by linkages 252 each having one of its ends 253 pivotally connected to the carriage and its other end 254 pivotally connected to a link 255 of the adjacent sprocket chain 237. The ratios of the various gears of the drive mechanism for the carriage 140 are such that upon one revolution of output sprocket 247 of clutch 248 link 255 of each of the sprocket chains 237 will travel at substantially the same rate of speed of conveyor 14 and between a position on the rearward side of sprocket 239 as shown in FIG. 15, in which the carriage will be in its rearward position, to a similar position but on the forward side of sprocket 238 in which the carriage will be in its forward position and vice versa or in other words, through a path one-half the length of the chain. Inasmuch as the chains are driven only in one direction pin 255 will be carried in the lower run of the sprocket chain when imparting one direction of movement to carriage 140 and in the upper run when imparting the opsite direction of movement to the carriage.

Referring now particularly to FIG. 6 bail guide channels 58 formed by the inner and outer bail guides 57 and 50 respectively terminate at a point slightly forwardly of star wheels 111. At locations intermediate star wheels 61 and star wheels 110 the bail guide channels are twisted and shifted outwardly whereby as the can bails move therealong they will be rotated from their vertical positions to substantially inclined positions (see FIG. 5), where they are out of the way of the can holding devices 168 to 171 as the cans move into position thereunder, and will be maintained in the latter positions for the remainder of their travel within the channels. Bail deflecting members 260 are secured to the inner bail guides 57 adjacent the forward ends of the latter. Deflecting members 260 suitably comprise relatively stiff wires and forwardly of their connection with the bail guide channels are bent outwardly and downwardly (see FIGS. 5 and 6) to cam the can bails against the outer walls of the cans.

Figure 20:
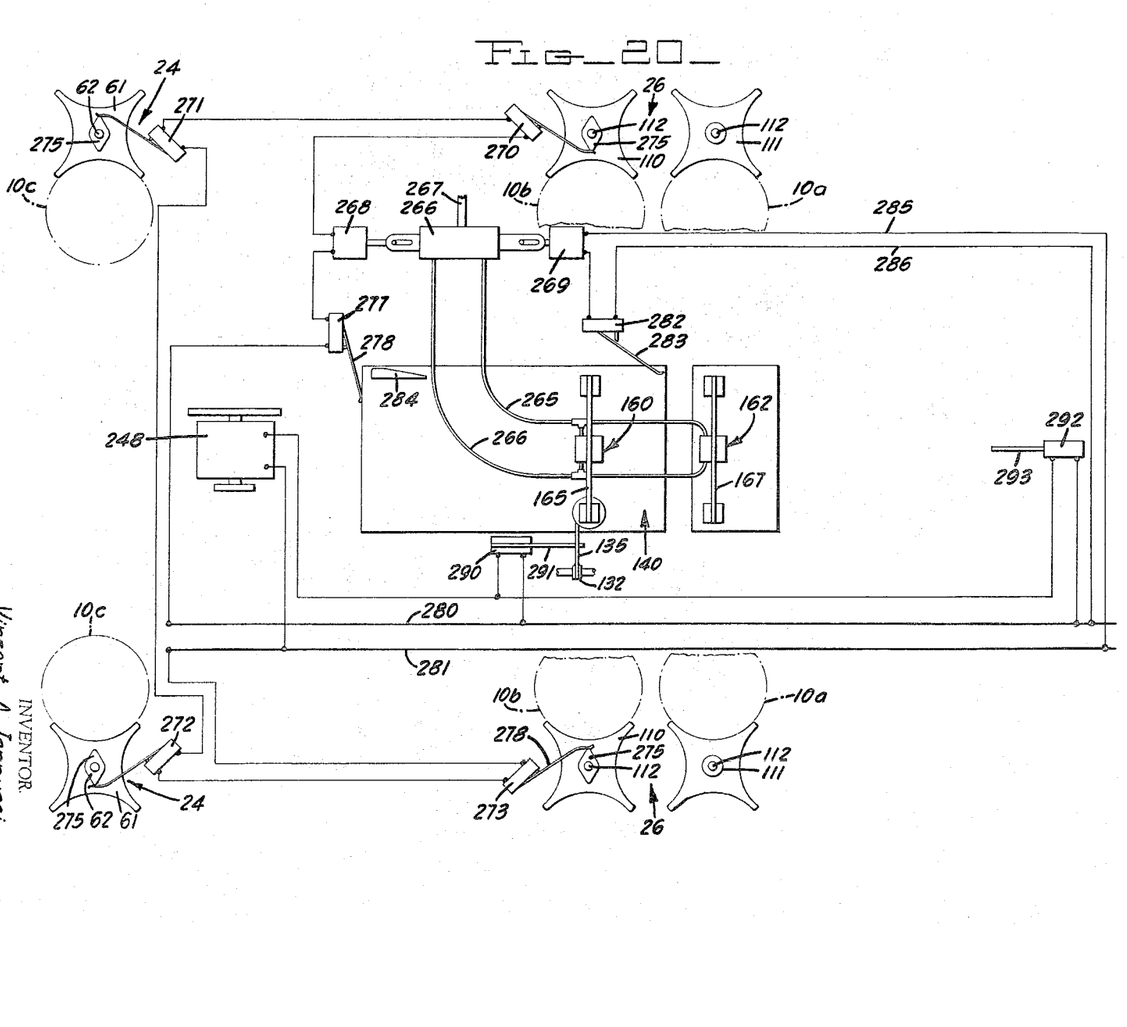
FIG. 20 is a schematic view of elements of the apparatus and controls therefor including a wiring diagram.

Referring now to FIG. 20 the pneumatic piston-cylinder assemblies 160 and 162 are connected by flexible hoses 265 to a solenoid operated valve 266 which in turn is connected by a line 267 to an air pump or other suitable source of air under pressure. Solenoid operated valve 266 is of a commercial type whereby in one setting of the valve air under pressure is supplied to the cylinders to cause downward movement of the pistons and in the other setting the air pressure is cut off and the cylinders exhausted to permit upward movement of the pistons under the influence of springs 176. The valve is moved between the two settings by the energization of solenoids 268 and 269 respectively. Solenoid 268 is connected into an electrical circuit in series with micro-switches 270, 271, 272 and 273. The actuating arms of micro-switches 270 through 273 are moved between their switch opening and switch closing positions by cam members 275 one of said cam members being fixed to the shaft 62 of each star wheel 61 and to the shaft 112 of each star wheel 110. Each cam has two risers and is so positioned on its star wheel shaft that when the associated star wheel is in either of its locked positions previously described a riser of the cam closes the switch. Also in the circuit in series with the solenoids 268 and micro-switches 270 through 273 is a micro-switch 277 mounted on the framework of the machine and having an actuating arm 278 adapted to be depressed to close the switch when the carriage is moved to its rearward position illustrated in FIGS. 1 and 3. The circuit just described obtains its energy from main power leads 280 and 281.

Solenoid 269, which when energized closes valve 266, is connected into a second electrical circuit in series with a micro-switch 282 having an actuating arm 283 adapted to be depressed to close the switch when contacted by a cam 284 mounted on carriage 140 adjacent the rear end thereof. The relative positions of arm 283 and cam 284 are such that switch 282 is closed when the carriage reaches its forward position. The second circuit obtains its energy from power leads 280 and 281 through leads 285 and 286.

The solenoid of clutch 248 is connected to main leads 280 and 281 through a third electrical circuit which includes a micro-switch 290 having an actuating arm 291 adapted to underlie and to be depressed to switch closing position by arm 135 of lever 132 when the latter is rotated by descending movement of crosshead 165. The third circuit also includes a micro-switch 292 having an actuating arm 293 positioned to overlie crosshead 167 when the carriage is moved to its forward position and to be contacted by the crosshead as the crosshead is elevated upon the cutting off of air pressure to the pneumatic cylinder piston assembly 162. As will be understood when either of switches 290 or 292 is closed the solenoid of clutch 248 is energized.

The over-all operation of the machine will now be described assuming a resumption of operations after the supply of cans to the conveyor 14 has been interrupted by a shutdown or otherwise. It will be assumed that cans, can 10a and can 10b, have remained in each lane confined by the star wheels 110 and 111 with the latter in their locked position as shown in FIG. 8. Also that there are no other cans in the machine and that star wheels 61 are in the positions they take just prior to assuming their locked positions shown in FIG. 14a, namely the positions in which they were left by the passage of cans 10b, and that the carriage 140 is in its rearward postion. Under such conditions micro-switches 270, 273 and 277 are closed but the first electrical circuit is not energized due to switches 271 and 272, controlled by the star wheel 61, remaining open. If now the conveyor is driven and the feeding of cans thereto is resumed the cans will be alternately shunted into the two different lanes as previously explained with their bails confined by the bail guides. As the foremost can in the succession of cans in each lane reaches its star wheel 61 it will rotate the star wheel to the locked position of FIG. 14a, the rotation of the star wheel simultaneously closing micro-switch 271 or 272 as the case may be. When both star wheels 61 are so positioned by the leading cans in both lanes the first electrical circuit is closed energizing solenoid 268 and opening valve 266 whereby air under pressure is supplied to the assemblies 160 and 162 and crossheads 165 and 167 lowered and can holding devices 168 and 169 brought into gripping contact with the rims of cans 10a held by the star wheels 111 and can holding devices 170 and 171 brought into gripping contact with the rims of cans 10b held by the star wheels 110.

Also on the downward movement of the can holding devices 170 and 171 collars 183 contact the ends of levers 135 and depress them to release star wheels 110 and 111 in the manner previously explained. Depression of one of the levers 135, the right-hand lever as viewed in FIG. 5, also causes depression of arm 291 of microswitch 290 closing the third electrical circuit and energizing the solenoid of the one revolution clutch 248 with the result that the clutch is energized and the drive of chains 237 and the forward movement of the carriage 140 is initiated. The cans 10a and 10b confined between the belts and can holding devices are consequently moved forwardly. As pointed out above the belts and the carriage travel at the same or substantially the same rate but in any event the carriage is the dominant factor and in the event of any differential in speed the cans will slip relatively to the belts until the forward ends of the belts are reached. Thereafter the carriage will move the cans onto and across dead plate 28.

Upon the forward movement of the carriage 140 microswitch 277 is opened thereby de-energizing the first electrical circuit. Also upon the forward movement of the carriage lever arm 90 is rotated in a counterclockwise direction, as viewed in FIG. 12, as cam plate 98 carried by the carriage contacts and depresses follower roller 93 thereby releasing star wheels 61 in the manner previously explained.

The carriage continues to move forwardly under the drive of chains 237. When the front edge of bed member 146 contacts stop screws 236 bed member 145 continues to move until the cans 10b are brought against the cans 10a, springs 152 being compressed during this final movement of bed member 145. At this point clutch 248 has completed its one revolution and the drive of the carriage is stopped with linkages 252 again in the horizontal position. During the forward movement of the carriage the can bails were carried out of the guide channels 58, which had held them in an inclined position from a point rearwardly of star wheels 110 and 111, and were brought into contact with the side walls of the cans by the camming members 260. Also during this forward movement the cans were rotated in the manner previously explained through contact of the rollers of arms 186, 205, 210 and 220 with their respective cam tracks to position the bails of the cans across the corners of the group. As will be noted the cams at this stage are in closely grouped relationship on dead plate 28 in position for loading into a case or carton.

As the carriage reaches its final forward position contact 283 of micro-switch 282 is closed by cam 284 thereby closing the second electrical circuit and energizing solenoid 269 to close valve 266 and thereby cut off the air pressure to and vent piston-cylinder assemblies 160 and 162 whereby the several can holding devices 168 to 171 are caused to be raised under the action of springs 176 and the group of cans is released for the case loading operation. The latter as previously explained is performed by a suitable plunger means indicated diagrammatically at 30 in FIG. 3 which may take any usual or desirable form but preferably is that disclosed in the prior application Serial No. 151,492 of J. L. Ferguson et al. previously mentioned Patent No. 3,209,512. The operation of the plunger may be automatically timed with the operation of the instant machine or it may be otherwise controlled as desired.

As the crosshead 167 of cylinder assembly 162 moves upwardly upon the closing of the air pressure line to the piston-cylinder assemblies it contacts arm 293 of microswitch 292 again closing the third electrical circuit and energizing the solenoid of clutch 248 to again engage the clutch whereby the driving of the chains is resumed and the carriage begins its return movement, this movement continuing during one revolution of the clutch which brings the carriage to its rearward position where it is temporarily held by latch 225–227.

As previously mentioned star wheels 110 and 111 are released for rotation by the cans upon the lowering of the can holding devices into contact with the cans. Also star wheels 61 are released substantially immediately upon the forward movement of the carriage by the downward rotation of arm 90 under the influence of cam 98. Consequently cans 10c will rotate star wheels 61 and pass beyond them and then into contact with star wheels 110 the latter having been left, after their rotation by cans 10b in the position shown in FIG. 10. Continued movement of cans 10c with the conveyor belts will rotate the star wheels 110 through ninety degrees and the cans will then pass therebeyond into contact with star wheels 111 which were also left in the position shown in FIG. 10. Star wheels 111 will be rotated by the cans to the locked position of FIG. 11 and thereafter hold cans 10c from further movement until the star wheels are again released.

In the meantime if there is reasonably close spacing between the cans of the succession of cans, or thereafter if the cans are widely spaced, the next can, can 10d, of each lane will be brought by the conveyor belt into contact with its star wheel 61 and rotate the latter and then move into contact with star wheel 110 to rotate it into locked position illustrated in FIG. 8. The next following can of each lane will contact its star wheel 61 and rotate it to again bring such star wheel into the locked position of FIG. 14a. At this point the micro-switches 270, 271, 272 and 273 are again closed. Upon return of the carriage to its rearward position, which as will be understood may occur either before or after all of the star wheels have been rotated to their locked positions by the cans, micro-switch 277 is closed. When all the micro-switches of the first circuit are so closed the machine operates through a second cycle in the same manner as in the first cycle to move the assembled group of cans, cans 10c and 10d, into loading position, to deflect their bails against the side of the cans, and to rotate the cans to place the bails across the corners of the group. Such cycles of operation will continue as long a sufficient number of cans are supplied to the conveyor to load each of the star wheels.

It will be understood from the foregoing that the machine described above has inherent safety features in that it will not operate to position cans for loading unless and until the group of cans is complete. If the supply of the cans is interrupted the machine will merely remain idle until the supply is resumed and will then automatically continue its operation. As pointed out above the loading plunger may be separately controlled or preferably its control may be incorporated in the machine control system to insure that a new load of cans will not be moved into loading position unless the loading plunger has completed its loading and return movement with respect to a previously positioned case load of cans.

Having thus described the invention in rather complete detail it will be understood that these details need not be strictly adhered to and that various changes and modifications may be made all falling within the scope of the invention as defined by the following claims. Thus for example pneumatic or hydraulic control systems may be substituted for the several electrical control circuits described above to reduce the hazard of explosion or fire where the air surrounding the machine may be permeated with volatile paint solvents or the like.

What is claimed is:

1. In a machine for arranging cans having bails secured in oppositely projecting bail ears for loading into cases, means for conveying a succession of said cans forwardly with their bails lying approximately in vertical planes extending in the line of travel of said cans, means for segregating a group defining a case load from said succession of cans, means for lowering the bails of each can of said group substantially into contact with the side wall thereof and means for shifting each can of said group to place its bail ears and bail in predetermined positions.

2. In a machine as defined in claim 1 wherein there is means for separating the cans of said succession into a plurality of lanes and said means for segregating a group of cans employs cans from each lane to form said group.

3. In a machine as defined in claim 1 wherein said means for shifting each can of a group comprises means for partially rotating said can.

4. In a machine as defined in claim 2 wherein said segregating means includes means for metering the cans of each lane.

5. In a machine for arranging cans having bails secured in oppositely projecting bail ears for loading into cases, means for conveying a succession of said cans forwardly with their bails initially lying approximately in vertical planes extending in the direction of travel of said cans, and means for rotating the bails of said cans toward the side walls thereof during said forward movement.

6. In a machine as defined in claim 5 wherein said means for gradually rotating the can bails comprises guide channels confining said bails during said forward movement, said channels including portions shaped and positioned to partially rotate and depress said bails, and camming means forwardly of said channels to further rotate and depress said bails.

7. In a machine for arranging cans having bails secured in oppositely projecting bail ears for loading into cases, means for supplying the cans in a single file with their bails lying in substantially vertical planes, means for dividing said cans into a plurality of lanes, means for conveying successions of said cans in each of said lanes, and means for initially maintaining the bails of the cans of each lane in substantially vertical planes extending in the direction of travel of said cans and for thereafter rotating said bails toward the side walls of said cans during said forward movement, said last named means comprising bail guide channels positioned to overlie each of said lanes.

8. In a machine for arranging cans for loading into cases, means for conveying a succession of said cans forwardly in each of a plurality of lanes, means for grouping a case load of said cans and for temporarily holding said cans stationary, means including a carriage having can holding means in overlying relationship to said cans while they are temporarily held stationary, means for moving said can holding means into contact with said cans, and means for moving said cariage and said can holding means forwardly to carry said cans into case loading position.

9. In a machine as defined in claim 8 wherein there is means for partially rotating said can holding means and the cans held thereby during the forward movement thereof.

10. In a machine for arranging containers for loading into cases, means for conveying a succession of said containers forwardly in each of a plurality of lanes, means for grouping a case load of said containers with said case load being made up of containers from each lane, means for temporarily holding the group of containers stationary, a carriage supported for movement between forward and rearward positions, container holding means carried by said carriage and each adapted to overlie the position of a container of said group when said cariage is in its rearward position, means for moving said container holding means into gripping contact with said containers, means for driving said carriage in forward and rearward strokes between said rearward and forward positions, and means to release said containers from said container holding means when said carriage is in its forward position.

11. A machine as defined in claim 10 wherein said means for temporarily holding said group of containers stationary comprises star wheels and means for locking said star wheels against rotation and there is means operative upon the movement of said container holding means into gripping contact with said containers to release said locking means.

12. In a machine as defined in claim 10 wherein said means for moving said carriage between its rearward and forward positions comprises a single revolution clutch and driving connections between said clutch and said carriage.

13. In a machine as defined in claim 11 wherein there is means for actuating said driving means to move said carriage from its rearward to its forward position upon the movement of said container holding means into gripping contact with said containers.

14. In a machine as defined in claim 12 wherein there is means for activating said single revolution clutch upon movement of said container holding means into gripping contact with said containers.

15. In a machine for arranging cans for loading into cases, means for conveying a succession of said cans forwardly, means for grouping a case load of said cans, releasable means for temporarily holding said grouped cans stationary, a carriage supported for movement between a rearward and a forward position, can holding devices carried by said carriage and each overlying the position of one of said grouped stationary cans when said carriage is in its rearward position, means for moving said can holding devices into gripping contact with the stationary cans, means for driving said carriage in forward and reverse strokes between its rearward and forward positions, means to release said cans from said can holding devices when said carriage is moved to its forward position, means to actuate said carriage driving means for movement of said carriage through a forward stroke upon movement of said can holding devices into gripping contact with said cans, and means for activating said carriage driving means for movement of said carriage through a return stroke upon the release of said can holding devices from said cans.

16. A machine as defined in claim 15 wherein said carriage driving means comprises a single revolution clutch.

17. A machine as defined in claim 16 wherein said clutch is constructed and arranged to drive said carriage through one stroke upon the actuation thereof.

18. A machine as defined in claim 10 wherein there is means for partially rotating said container holding means and the containers held thereby during movement of said carriage in its forward stroke.

19. A machine as defined in claim 18 wherein said means for partially rotating said container holding means comprises cooperating cams and cam followers.

20. A machine as defined in claim 19 wherein said cams have cam paths extending in the direction of travel of said carriage.

21. In a machine for arranging containers for loading into cases, means for conveying a succession of said containers forwardly in each of a plurality of lanes, means for metering containers from the succession in each lane to measure a case load thereof, to lock and releasably retain a following container in each lane, releasable means to group the metered containers and to temporarily hold them stationary, a carriage supported for movement between rearward and forward positions, container holding devices supported by said carriage and each overlying one of said containers held stationary by said grouping means when said carriage is in its rearward position, means for moving said container holding devices into gripping contact with said stationary containers, means for driving said carriage in forward and reverse strokes between said rearward and forward positions, and control means operable upon the completion of the grouping and holding of a case load of cans and upon the retention of a following can in each lane by the metering means to initiate the operation of said means for moving said container holding devices into gripping contact with said grouped containers.

22. A machine as defined in claim 21 wherein there is means operable upon movement of said container holding devices into gripping contact with said containers to release said releasable container grouping and holding means.

23. A machine as defined in claim 22 wherein there is means operable upon the movement of said container holding devices into gripping contact with said containers for actuating said carriage driving means through a forward stroke.

24. A machine as defined in claim 22 wherein there is means operable upon the movement of said carriage in a forward stroke to unlock said metering means to release the containers held thereby.

25. A machine as defined in claim 24 wherein there is means operable upon the completion of said forward stroke to release said containers from said container holding means.

26. A machine as defined in claim 25 wherein there is means operable upon the release of said containers from said container holding means to activate said carriage driving means through a return stroke.

27. In a machine for arranging cans for loading into cases, means for grouping a case load of said cans and temporarily holding them stationary, a carriage supported for movement between forward and rearward positions, can holding devices carried by said carriage and each overlying the position of one of said stationary cans when said carriage is in its rearward position each of said can holding device comprising a can gripping member, means supporting each can gripping member for rotational movements, an arm carried by each can holding device and including a cam follower, and cam means for cooperation with said cam follower upon movement of said carriage through a forward stroke to cause partial rotation of said can gripping member.

28. In a machine for arranging cans having bails secured in oppositely projecting bail ears for loading into cases, means for conveying a succession of said cans forwardly with their bails lying approximately in vertical planes extending in the line of travel of said cans, means for separating said succession of cans into two lanes, means for metering cans from each lane to measure a case load and to releasably retain a following can in each lane, releasable means forwardly of said metering means to loosely group the metered cans and temporarily hold them stationary, means intermediate said metering means and said releasable means to move the bails of the cans from their approximately vertical planes to outwardly inclined planes, means to release said releasable means and to move said loosely grouped cans to a loading zone and form them into a compact group therein, and means to move the bails from their inclined positions into contact with the walls of the cans of the group and to partially rotate the cans to position the vertical planes of their bail ears across the corners of the group during said movement of said group.

29. In a machine for arranging cans for loading into cases, means for conveying cans forwardly in a lane, a can metering device adjacent said lane comprising means for permitting the passage of a predetermined number of cans in said lane and temporarily restraining following cans against movement with said conveying means, means forwardly of said metering device for grouping said predetermined number of cans and temporarily holding them stationary, means for releasing said grouped cans, and means independent of said conveyor for conveying said grouped cans forwardly on said conveyor substantially simultaneously with their release, said grouping means comprising star wheels equal in number to said predetermined number of cans and mounted for rotation by said predetermined number of cans into positions in which one of said cans is opposite each of said star wheels, and releasable means for holding said star wheels stationary and preventing the further movement of said predetermined number of cans when in such positions.

References Cited by the Examiner

UNITED STATES PATENTS

| | | | |
|---|---|---|---|
| 1,839,327 | 1/1932 | Mayo | 198—31 |
| 2,052,840 | 9/1936 | Nussbaum | 198—40 |
| 2,878,919 | 3/1959 | Jones | 198—34 |
| 3,107,775 | 10/1963 | Dardaine | 198—34 |
| 3,209,512 | 10/1965 | Ferguson | 53—61 |

References Cited by the Applicant

UNITED STATES PATENTS

| | | |
|---|---|---|
| 976,540 | 11/1910 | Bergner. |
| 1,236,389 | 8/1917 | Augensen. |
| 1,472,395 | 10/1923 | Iacobitti. |
| 1,740,893 | 12/1929 | Hoyt. |
| 1,824,432 | 9/1931 | Hendry. |
| 2,587,953 | 3/1952 | Arneson. |
| 2,650,746 | 9/1953 | Rideout et al. |
| 2,963,143 | 12/1960 | Field. |
| 2,990,934 | 7/1961 | Flynn. |
| 3,060,659 | 10/1962 | Blais et al. |

EVON C. BLUNK, *Primary Examiner.*

EDWARD A. SROKA, *Examiner.*